United States Patent
Cayley, Sr. et al.

(10) Patent No.: US 10,556,312 B2
(45) Date of Patent: Feb. 11, 2020

(54) INDEXER FOR OPERATING WORKPIECES

(71) Applicant: MIDACO CORPORATION, Elk Grove Village, IL (US)

(72) Inventors: Michael Paul Cayley, Sr., South Barrington, IL (US); Malcolm E. Keith, Cape Coral, FL (US)

(73) Assignee: MIDACO CORPORATION, Elk Grove Village, IL (US)

( * ) Notice: Subject to any disclaimer, the term of this patent is extended or adjusted under 35 U.S.C. 154(b) by 303 days.

(21) Appl. No.: 15/254,490

(22) Filed: Sep. 1, 2016

(65) Prior Publication Data

US 2018/0057276 A1   Mar. 1, 2018

(51) Int. Cl.
*B23Q 16/02* (2006.01)
*B23Q 7/14* (2006.01)

(52) U.S. Cl.
CPC ......... *B23Q 16/025* (2013.01); *B23Q 7/1431* (2013.01)

(58) Field of Classification Search
CPC .............................................. B23Q 16/02–107
See application file for complete search history.

(56) References Cited

U.S. PATENT DOCUMENTS

| | | | | |
|---|---|---|---|---|
| 1,792,612 A | * | 2/1931 | Staley ................... | B25H 1/0007 248/185.1 |
| 2,948,542 A | * | 8/1960 | Leifer ............... | B23B 31/16204 279/5 |
| 3,010,371 A | * | 11/1961 | Riedel .................. | B23Q 7/1489 198/345.3 |
| 3,155,217 A | * | 11/1964 | Cross ...................... | B23Q 1/28 198/345.3 |
| 3,540,318 A | * | 11/1970 | Greenberg ............... | B23Q 3/18 24/33 P |
| 3,807,035 A | * | 4/1974 | Moorman ................ | B23Q 1/38 108/57.15 |
| 4,148,400 A | * | 4/1979 | Cross ................... | B23Q 16/083 198/345.3 |
| 5,205,806 A | * | 4/1993 | Ishida ................... | B23F 23/006 29/33 P |
| 5,348,142 A | * | 9/1994 | Nishimura ........... | B23Q 7/1426 198/803.11 |
| 5,535,995 A | * | 7/1996 | Swann ................... | B23Q 3/103 269/152 |
| 5,562,277 A | * | 10/1996 | Swann ................... | B23Q 3/103 269/152 |

(Continued)

*Primary Examiner* — Tyrone V Hall, Jr.
(74) *Attorney, Agent, or Firm* — Pauley Erickson & Kottis

(57) ABSTRACT

A method and apparatus for changing pallets delivered to a machining center. Different workpieces are connected or attached to different pallets. A first workpiece corresponding to a first pallet is delivered to or near an indexer or indexer assembly and the indexer is moved into an engaged position and performs a work operation on the first workpiece. The indexer is then moved to a disengaged position and the first pallet and the first workpiece are exchanged or switched out with a second pallet having a second workpiece. The indexer is then moved to an engaged position and works the second workpiece and when completed, the indexer moves to the disengaged position and the second workpiece is exchanged or switched out with a third pallet having a third workpiece. The indexer system of this invention can quickly and cost-effectively cycle through different pallets and thus different workpieces.

15 Claims, 4 Drawing Sheets

(56) References Cited

U.S. PATENT DOCUMENTS

| | | | | |
|---|---|---|---|---|
| 5,799,912 A | * | 9/1998 | Ponzio | B23Q 1/28 |
| | | | | 248/121 |
| 6,918,579 B2 | * | 7/2005 | Ponzio | B23Q 7/1426 |
| | | | | 269/309 |
| 2007/0262507 A1 | * | 11/2007 | Bayer | B23Q 1/0018 |
| | | | | 269/305 |
| 2009/0026683 A1 | * | 1/2009 | Bayer | B23Q 3/02 |
| | | | | 269/305 |
| 2010/0294173 A1 | * | 11/2010 | Omori | B23Q 1/5437 |
| | | | | 108/5 |
| 2015/0175362 A1 | * | 6/2015 | Saito | B23Q 16/08 |
| | | | | 269/56 |

* cited by examiner

INDEXER FOR OPERATING WORKPIECES

BACKGROUND OF THE INVENTION

Field of the Invention

This invention relates to a method and apparatus for changing pallets, such as pallets delivered to a machining center.

Discussion of Related Art

In some conventional axis plate assemblies, pallets are locked to baseplates that are integrated with, part of or located near machining centers. Some conventional axis plate assemblies rigidly connect a workpiece to a bearing housing and after the workpiece has been worked, the workpiece must be dismantled from the bearing housing and a new workpiece then must be installed on the bearing housing.

Many conventional axis plate assemblies have a solid connection between the workpiece and the bearing housing or the rotating assembly. After an operation has been performed on the workpiece, at least a portion of the axis plate assembly needs to be dismantled or broken down to remove the worked workpiece.

There is an apparent need for an indexer assembly that can be quickly and cost effectively changed out so that a worked or spent workpiece can be replaced with an unworked or new workpiece.

SUMMARY OF THE INVENTION

The method and apparatus of this invention allow a pallet system to deliver and quickly exchange or change out different plate assemblies or pallets that each have different attached or secured workpieces that need to be worked. An indexer is movably mounted with respect to a workpiece, a baseplate and/or a pallet. In an engaged position of the indexer, a first workpiece is worked. In a disengaged position of the indexer, the first workpiece that has been worked is removed, exchanged or changed out with a second workpiece that requires work. The indexer can then be moved to the engaged position so that the second workpiece is worked. The indexer can cycle through engaged positions and disengaged positions and shuttle systems can deliver so that multiple workpieces corresponding to multiple pallets can be worked efficiently.

In some embodiments of this invention, the indexer quickly and effectively moves into different positions with respect to the axis plate assembly and/or any element or component that is part of or connected to the axis plate assembly. The indexer of this invention can have many different elements and/or method steps that allow the indexer to quickly move from the engaged position to the disengaged position and then back to the engaged position.

In some embodiments of this invention, the indexer needs to be out of the way in order to exchange, change out and/or swap out the pallets, such as from the axis plate assembly. In the engaged position, which can be at the end of a pallet change, a controller having a preloaded program can run the indexer in order to operate or perform work on the workpiece. After the workpiece has been worked, a shuttle or other similar device can remove the pallet with the worked workpiece and replace it with a new pallet with a new workpiece to be worked. The shuttle can be operated throughout multiple cycles of the indexer operating between the engaged position and the disengaged position.

BRIEF DESCRIPTION OF THE DRAWINGS

The above and other features and objects of this invention are better understood from the following detailed description taken in view of the drawings wherein.

DETAILED DESCRIPTION OF THE INVENTION

Figure 1:
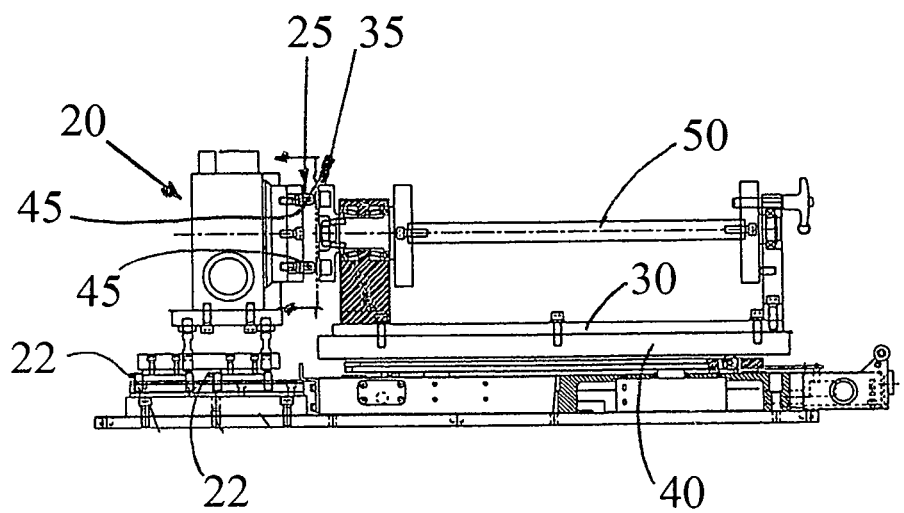
FIG. 1 is a front view of an indexer assembly, according to one embodiment of this invention.
Figure 2:
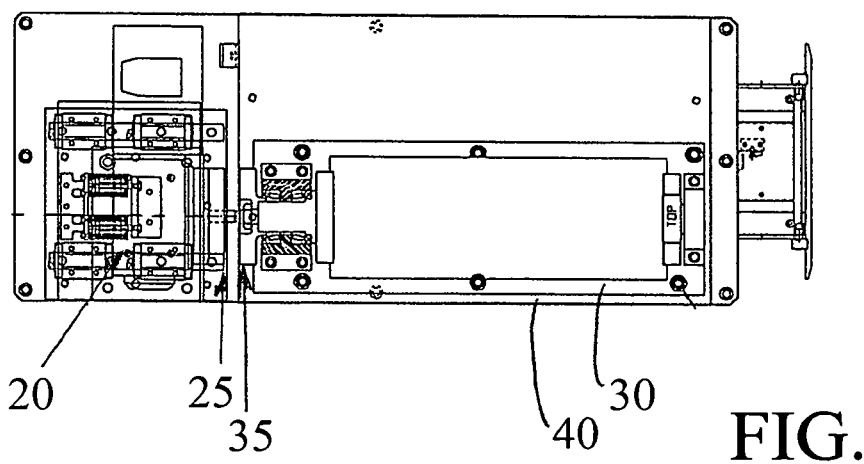
FIG. 2 is a top view of the indexer assembly, as shown in FIG. 1.
Figure 3:
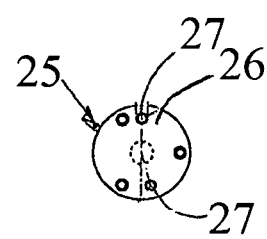
FIG. 3 is a sectional view of a driver, taken along line 3-3 as shown in FIG. 1, according to one embodiment of this invention.
Figure 4:
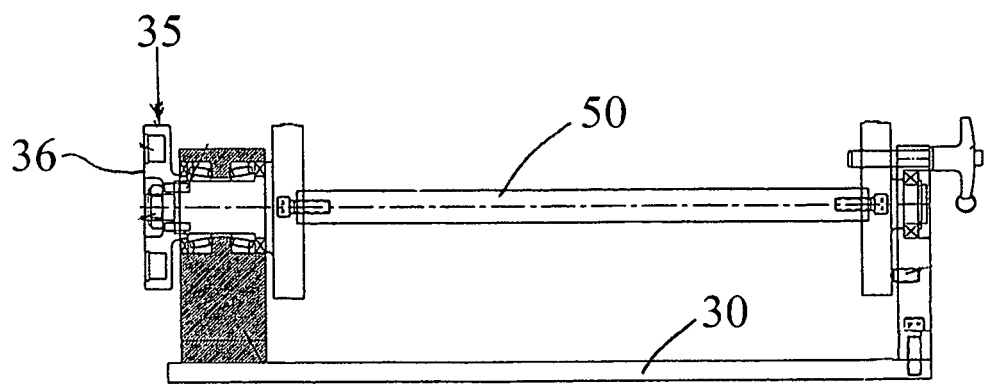
FIG. 4 is a front view of an axis plate assembly, according to one embodiment of this invention.
Figure 5:
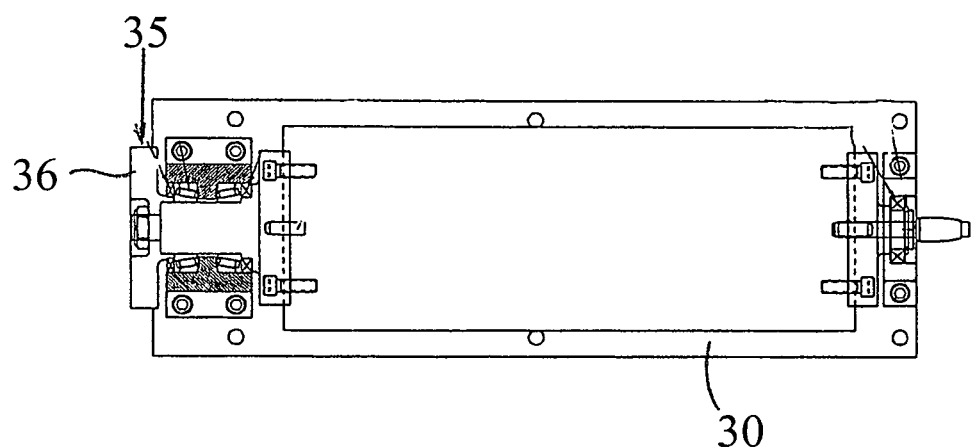
FIG. 5 is a top view of the axis plate assembly, as shown in FIG. 4.
Figure 6:
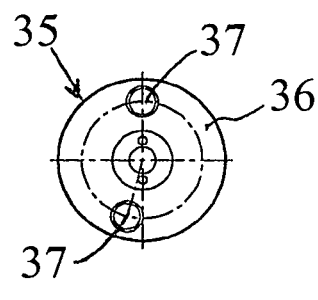
FIG. 6 is a front view of a driver, according to one embodiment of this invention.

FIGS. 1 and 2 show a front view and a top view, respectively, of an indexer or indexer assembly, according to one embodiment of this invention. As used throughout this specification and in the claims, the terms indexer and indexer assembly are intended to each relate to a machine, a system and/or an apparatus that can operate a workpiece, for example, mounted within an axis plate assembly, and the terms are intended to be interchangeable with each other.

As shown in FIGS. 1 and 2, for example, pallet 30 is attached, secured, connected and/or otherwise fixed in position with respect to baseplate 40. In some embodiments of this invention, workpiece 50 is secured and/or otherwise detachably mounted in a fixed position and/or an operable position, for example to pallet 30 and/or baseplate 40, so that a machining center or another suitable tool can perform work on workpiece 50. In some industries, this type of operation or work is known as indexing fixturing.

As shown in FIGS. 1 and 2, indexer 20 can be moved and then fixed in position with respect to pallet 30, baseplate 40 and/or workpiece 50. In some embodiments of this invention, as indexer 20 moves toward and/or engages with driver 35, driver 25 engages with and locks the relative movement of driver 35 with respect to driver 25, and in an engaged position of indexer 20 with respect to pallet 30, baseplate 40 and/or workpiece 50, indexer 20 can run a preloaded program or operate driver 25 which is engaged with driver 35, so that work can be performed on workpiece 50. As indexer 20 moves away from and/or disengages with driver 35, driver 25 releases from the engaged position with respect to driver 35 and thus stops the operation or work being performed on workpiece 50.

With movement of indexer 20 with respect to pallet 30, baseplate 40 and/or workpiece 50, it is possible to engage and perform an operation on workpiece 50 and then disengage, switch out or exchange a first workpiece 50 with a second workpiece 50, such as by using different pallets 30. In some embodiments of this invention, each separate workpiece 50 is mounted to one corresponding pallet 30 and/or baseplate 40. This arrangement allows indexer 20 to move away from pallet 30, baseplate 40 and/or workpiece 50 so that a first workpiece 50 can be switched out with a second workpiece 50, and then allows indexer 20 to move toward pallet 30, baseplate 40 and/or workpiece 50 to engage driver 35 and thus perform work and/or another suitable operation on the second workpiece 50. It is possible for indexer 20 to continue engagement and disengagement cycles and thus working on and exchanging further workpieces 50, in a similar manner. This invention also allows for a relatively quick change out of different workpieces 50, for example, by switching out or exchanging different pallets 30 and/or baseplates 40 that already have mounted corresponding workpieces 50, such as unworked workpieces 50.

In some embodiments of this invention, indexer 20 is an indexing machine manufactured by Haas Automation Inc. In other embodiments of this invention, indexer 20 can be an indexing machine manufactured and/or supplied by any other suitable manufacture or supplier of indexers or other similar systems and/or machines.

In some embodiments of this invention, a method for changing pallets 30 delivered to a machining center, a pallet system, a pallet changer and/or any other similar or suitable apparatus and/or method for changing pallets 30, includes fixing a first pallet 30 with respect to baseplate 40. Pallet 30 can be fixed, secured, attached, releasably attached and/or otherwise have a constant or a fixed position with respect to baseplate 40. In some embodiments of this invention, an axis plate assembly, such as those known in the industry, can be used to mount, secure and/or otherwise fix a relative position of workpiece 50 with respect to pallet 30, baseplate 40 and/or the axis plate assembly. Any suitable fastener and/or securing system can be used to secure, mount and/or otherwise fix a position of pallet 30 directly and/or indirectly to baseplate 40.

In some embodiments of this invention, indexer 20 is movably mounted with respect to pallet 30, baseplate 40 and/or workpiece 50 and/or any other suitable structural member. According to some embodiments of this invention, indexer 20 can be mounted on any one or more suitable bearings, bearing systems, rails, tracks and/or any other suitable support structure that allows indexer 20 to be moved with respect to pallet 30, baseplate 40 and/or workpiece 50.

As shown in FIGS. 1 and 2, indexer 20 can move such as in a horizontal direction from left to right, for example, so that indexer 20 can move towards or away from pallet 30, baseplate 40 and/or workpiece 50 and/or any other suitable connected or related structural member. According to some embodiments of this invention, driver 25 is attached, secured and/or otherwise mounted directly or indirectly to indexer 20, and driver 35 is attached, secured and/or otherwise mounted directly or indirectly to pallet 30, baseplate 40 and/or workpiece 50. Driver 25 and/or driver 35 can comprise any suitable drive, drive element and/or drive system that can engage with each other to form an engaged connection between driver 25 and driver 35, and that can also disengaged from each other to form a disengaged connection between driver 25 and driver 35.

In some embodiments of this invention, indexer 20 moves a distance or far enough towards driver 35 so that driver 25 engages with driver 35 and releasably and lockingly holds and/or secures driver 25 directly and/or indirectly with respect to driver 35. In the engaged position, such as of driver 25 with respect to driver 35, a controller communicating with indexer 20 can run from a preloaded program an operation or can be operated to perform work and/or an operation on workpiece 50 which is operably fixed or mounted with respect to pallet 30. After indexer 20 operates to perform work on a first workpiece 50, the first workpiece 50 can be switched out with a second workpiece 50, and then indexer 20 can operate to perform work on the second workpiece 50. Indexer 20 can continue to operate to perform work on further workpieces 50 which can be exchanged or switched out easily with the apparatus and method according to this invention. In some embodiments of this invention, a shuttle system and/or a pallet system such as an automatic pallet system can be used to exchange or switch out different pallets 30 and/or workpieces 50.

In some embodiments of this invention, after indexer 20 operates to perform work on workpiece 50, driver 25 is disengaged from or with respect to driver 35. In the disengaged position of drivers 25 and 35, indexer 20 is moved away from driver 35 and thus disengages the connection or engagement between driver 25 and driver 35. In the disengaged position of drivers 25 and 35, any suitable pallet changing system can exchange or change out a previous pallet 30 with a subsequent or next pallet 30. After pallets 30 are exchanged, indexer 20 can then again move towards driver 35 and engage driver 25 and driver 35, so that indexer 20 can perform another or subsequent operation to work on or modify workpiece 50.

Figure 7:
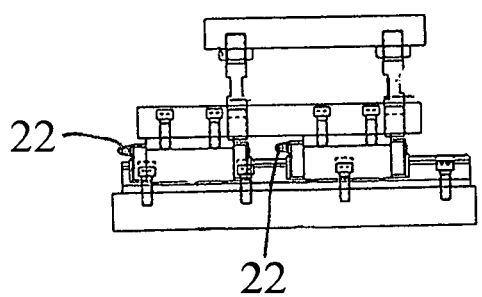
FIG. 7 is a side view of a frame structure for supporting an indexer, according to one embodiment of this invention.

In some embodiments of this invention, indexer 20 is movable or moves in a direction, such as a horizontal direction as shown in FIG. 1. According to some embodiments of this invention, indexer 20 is mounted directly and/or indirectly on or with respect to a frame, a structure and/or any other suitable apparatus and/or any component of a method that allows indexer 20 to be moved with respect to pallet 30, baseplate 40 and/or workpiece 50. In some embodiments of this invention, indexer 20 moves along bearing 22, such as shown in FIGS. 1 and 7. In some embodiments of this invention, air cylinders or pneumatic cylinders are connected or attached to indexer 20 and/or any suitable structural element or frame part of or connected to indexer 20. In other embodiments of this invention, indexer 20 can be mounted in any other suitable manner, such as mechanically, electrically, electromechanically, magnetically and/or with any other element, system and/or method that allows indexer 20 to move with respect to pallet 30, baseplate 40 and/or workpiece 50.

Figure 14:
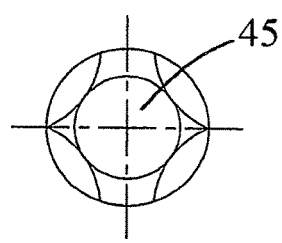
FIG. 14 is a side view of the drive pin or the lock element, as shown in FIG. 13.
Figure 13:
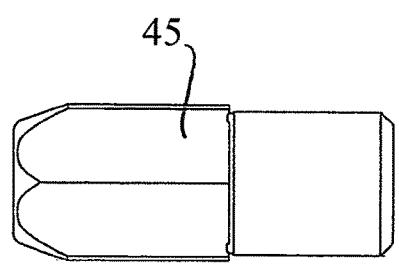
FIG. 13 is a front view of a lock element or a drive pin, according to one embodiment of this invention.

According to some embodiments of this invention, movement of indexer 20 moves and lockingly engages driver 25 with respect to driver 35. As shown in FIGS. 13 and 14, lock element 45 engages with and holds and/or locks driver 25 to driver 35. Lock element 45 can be engaged, for example, by moving indexer 20 towards driver 35. Lock element 45 can be disengaged, for example, by moving indexer 20 away from driver 35. Lock element 45 can have any suitable configuration, such as a lock pin or a locator pin configuration, such as shown in FIGS. 13 and 14, and/or can have any other suitable dimensions, configuration and/or design that allows driver 25 to engage with driver 35 and also that allows driver 25 to disengage with driver 35. In some embodiments, lock element 45 can have an overall tapered shape, such as a cup shape or a conical shape, and such shapes can assist with alignment of driver 25 as it moves toward and engages with driver 35.

Figure 10:
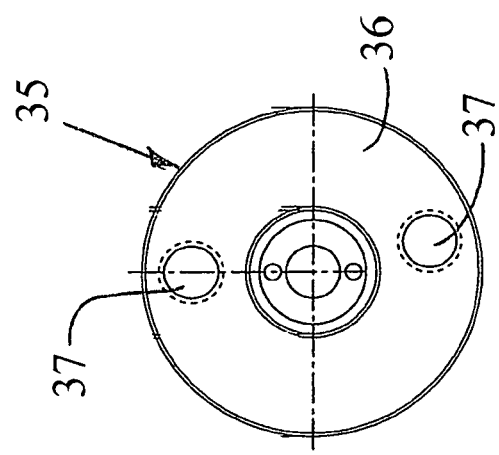
FIG. 10 is a rear view of the female drive plate, as shown in FIG. 8.
Figure 9:
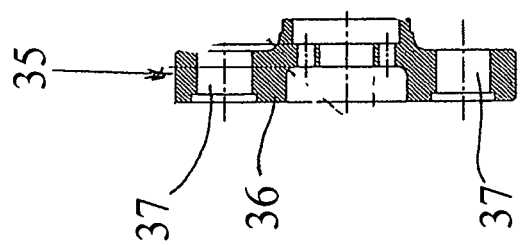
FIG. 9 is a sectional view of the female drive plate, as shown in FIG. 8.
Figure 8:
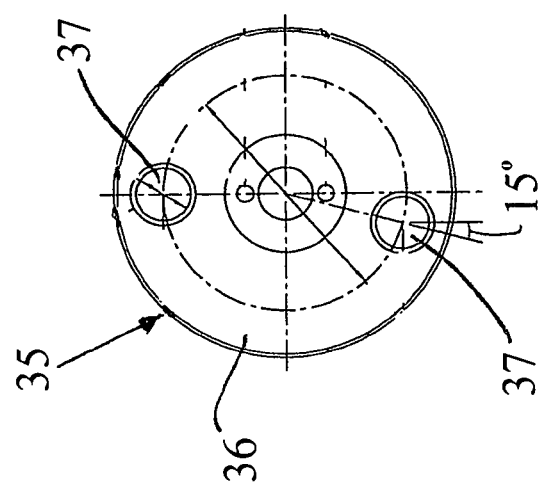
FIG. 8 is a front view of a female drive plate, according to one embodiment of this invention.

FIGS. 8-10 show one embodiment of driver 35 according to this invention. As shown, driver 35 comprises drive plate 36 which can be secured, attached and/or otherwise mounted directly to and/or indirectly with respect to the axis plate assembly and/or workpiece 50. In some embodiments of this invention, each pallet 30 has a corresponding workpiece 50 and the different pallets 30 are exchanged or switched out to deliver or provide different workpieces 50. Any other suitable driver 35 can be used to accomplish the same result of allowing indexer 20 to operate and engage driver 35 and thus to move or work on workpiece 50.

Figure 12:
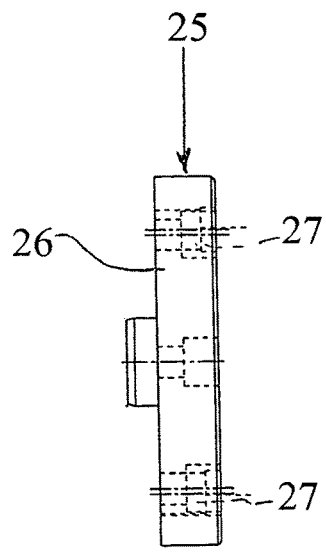
FIG. 12 is a side view of the male drive plate, as shown in FIG. 11.
Figure 11:
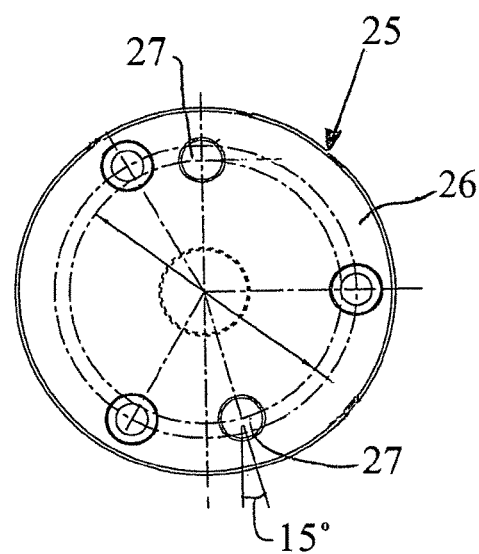
FIG. 11 is a front view of a male drive plate, according to one embodiment of this invention.

FIGS. 11 and 12 show one embodiment of driver 25 according to this invention. As shown, driver 25 comprises drive plate 26 which can be secured, attached and/or otherwise mounted directly to and/or indirectly with respect to indexer 20, for example. In some embodiments of this invention, indexer 20 moves in different ways or directions to engage or disengage driver 25 with respect to driver 35, which can allow a shuttle system and/or a pallet delivery system to exchange or change out different pallets 30 and thus feed different workpieces 50.

FIGS. 8-10 show one embodiment of drive plate 35 having two bores 37 that lockingly and engagingly accommodate lock element 45. FIGS. 11 and 12 show one embodiment of drive plate 25 having two bores 27 that engagingly accommodate lock element 45. As indexer 20 moves towards pallet 30, baseplate 40 and/or workpiece 50, each lock element 45 engages within bores 37 and 27 and thus lockingly holds or engages drive plate 35 to drive plate 25. FIGS. 8-12 show bores 27 and 37, on opposing sides offset from 180° apart, such as with about a 15° offset, and the offset allows driver 25 to connect with driver 35 in only one position, such as only one rotational position. Bores 27 and 37 and/or lock element 45 can have any other suitable dimension, configuration, shape and/or design that allows engagement and disengagement between driver 25 and driver 35, particularly as indexer 20 moves as described.

Drivers 25 and 35 can have a drive plate shape such as shown in FIGS. 8-12. In other embodiments of this invention, drivers 25 and 35 can have any other suitable design, dimension and/or shape that allows engagement and disengagement between driver 25 and driver 35, particularly as indexer 20 moves as described.

While in the foregoing specification this invention has been described in relation to certain preferred embodiments, and many details are set forth for purpose of illustration, it will be apparent to those skilled in the art that this invention is susceptible to additional embodiments and that certain of the details described in this specification and in the claims can be varied considerably without departing from the basic principles of this invention.

What is claimed is:

1. A method for changing pallets delivered to a machining center, the method including the steps of:
 fixing a first pallet of the pallets with respect to a baseplate;
 moving an indexer in a first direction toward the first pallet;
 engaging a first driver attached to the indexer with a second driver attached with respect to the first pallet;
 engaging a pair of lock elements to lock the first driver to the second driver, wherein the pair of lock elements are offset from 180° apart;
 working a workpiece mounted with respect to the first pallet;
 disengaging the first driver from the second driver by moving the indexer in an opposite second direction away from the first pallet, wherein moving the indexer releases the pair of lock elements engaging the first driver and the second driver; and
 exchanging the first pallet with a second pallet of the pallets.

2. The method according to claim 1, wherein the indexer is movably mounted with respect to the baseplate.

3. The method according to claim 2, wherein the indexer moves along a bearing fixed with respect to the baseplate, wherein the bearing travels in a direction parallel to an axis of the workpiece.

4. The method according to claim 1, wherein moving the indexer lockingly engages the first driver with respect to the second driver in only one position.

5. The method according to claim 1, wherein the indexer is moved with respect to the baseplate to exchange the first pallet with the second pallet.

6. The method according to claim 1, wherein the second pallet is locked with respect to the baseplate.

7. The method according to claim 1, wherein the first driver has a first drive plate and the second driver has a second drive plate lockingly engageable with the first drive plate, wherein one of the first drive plate and the second drive plate include the pair of lock elements and an other of the first drive plate and the second drive plate includes a corresponding pair of bores configured to receive the lock elements.

8. A method for changing workpieces delivered to a machining center, the method including the steps of:
 fixing a first pallet of pallets with respect to a baseplate, the baseplate having a longitudinal axis;
 movably mounting an indexer in a first direction toward the first pallet, wherein the first direction is parallel to the longitudinal axis of the baseplate;
 engaging a first driver attached to the indexer with a second driver attached with respect to the first pallet;
 engaging a pair of locking elements to lock the first driver to the second driver, wherein one of the first driver and the second driver include a pair of lock elements and an other of the first driver and the second driver includes a corresponding pair of bores configured to receive the pair of lock elements, wherein the pair of lock elements are offset from 180° apart;
 operating the indexer and working a first workpiece of the workpieces;
 disengaging the first driver from the second driver in a second direction away from the first pallet, wherein moving the indexer releases the pair of lock elements engaging the first driver and the second driver, wherein the second direction is opposite the first direction and parallel to the longitudinal axis of the baseplate; and
 exchanging the first pallet and the first workpiece with a second pallet of the pallets and a second workpiece.

9. The method according to claim 8, wherein moving the indexer lockingly engages the first driver with respect to the second driver in only one rotational position.

10. The method according to claim 8, wherein the first driver has a first drive plate including the pair of lock elements and the second driver has a second drive plate including the pair of bores, and lockingly engageable with the first drive plate.

11. The method according to claim 1, wherein the first direction and the second direction are each parallel to a rotational axis of the working piece.

12. The method according to claim 8, wherein the first direction and the second direction are each parallel to a rotational axis of the working piece during the working.

13. The method according to claim 1, wherein the first driver has a first drive plate including the pair of lock elements, and the second driver has a second drive plate including a pair of correspondingly offset bores lockingly engageable with the pair of lock elements of the first drive plate.

14. A method of changing pallets delivered to a machining center, the method including the steps of:
   fixing a first pallet of the pallets with respect to a baseplate;
   moving an indexer in a first direction toward the first pallet;
   engaging a first driver attached to the indexer with a second drive attached with respect to the first pallet;
   engaging a pair of lock elements to engage the first driver to the second driver, wherein the pair of lock elements are offset from 180° apart on a surface of a drive plate, the surface of the drive plate extending perpendicular to the first direction;
   working a workpiece mounted with respect to the first pallet;
   disengaging the first driver from the second driver by moving the indexer in an opposite second direction away from the first pallet, wherein moving the indexer releases the pair of lock elements engaging the first driver and the second driver; and
   exchanging the first pallet with a second pallet of the pallets.

15. The method according to claim 14, further comprising inserting the pair of lock elements into a correspondingly offset pair of bores in a surface of a second drive plate, wherein the surface of the second drive plate faces the surface of the drive plate.

\* \* \* \* \*